Patented Oct. 4, 1927.

1,644,244

UNITED STATES PATENT OFFICE.

MEYER L. FREED, OF WASHINGTON, DISTRICT OF COLUMBIA, ASSIGNOR, BY MESNE ASSIGNMENTS, TO SECRETARY OF COMMERCE OF THE UNITED STATES, AS TRUSTEE FOR THE GOVERNMENT OF THE UNITED STATES AND THE PEOPLE OF THE UNITED STATES.

COMPOSITION OF MATTER, A SUPERREFRACTORY BODY FORMED THEREFROM, AND PROCESS OF MANUFACTURING THE SAME.

No Drawing.  Application filed June 10, 1926. Serial No. 115,143.

(GRANTED UNDER THE ACT OF MARCH 3, 1883; 22 STAT. L. 625.)

The invention described may be used by the Government or any of its officers or employees in prosecution of work for the Government, or by any other persons in the United States without the payment to me of any royalty thereon.

This invention relates to a composition of matter, a super-refractory body formed therefrom, and the process of manufacturing the same, embodying the use of certain minerals, and particular methods of treatment, such as heat, crushing and pressure, and has for its object the formation of what is termed in the ceramic industry "a super-refractory body," which is particularly adapted for use in a brick, block, furnace lining, pot, crucible or any refractory ware calling for highly resistant qualities characteristic of an ideal refractory. Some of the qualities inherent in and secured by the subject of my discovery and invention are the definite high melting point which the product is capable of attaining; resistance to spalling; the ability to withstand heavy loads at high temperatures; no further non-reversible volume change at high temperatures; low coefficient of expansion; and resistance to corrosive slags.

Heretofore certain minerals and particularly various compounds of alumina and silica in form of slags or fusion products of the two oxides or their salts have been used in making refractory bodies, but so far as I am aware none of them has possessed all the characteristics of the ideal refractory such as I have produced, and which I have pointed out above; such as the definite high melting point, the ability to withstand heavy loads at high temperatures, resistance to spalling, no further non-reversible volume change at high temperatures, low coefficient of expansion and resistance to corrosive slags. That is to say, that whereas some of the previously known compounds may possess a high melting point together with the ability to withstand considerable loads at high temperatures; and some of them have possessed other valuable characteristics, yet so far they have failed to withstand all of the tests in their entirety or meet the requirements which have been met and sustained by my product and the sustaining of which is a necessary characteristic of an ideal super-refractory.

This is also true of refractory bodies composed of kaolin, diaspor, and a calcined mixture of clay, alumina and some flux.

In my opinion this failure is due in part at least to the inherent qualities or physical properties of the materials used; also in the failure to combine them in correct proportions to avoid excess in either the one or the other of the ingredients, or lack of proper heat treatment, or a combination of both, and also the absence of the important ingredient topaz.

Further, attempts to fuse alumina and clay to form mullite ($3Al_2O_3.2SiO_2$) have always resulted in a product having excess of either alumina or silica with siliceous clays. The failure of such a body to meet the requirements of an ideal refractory may be attributed, among other things, to the presence of an excess of either one or the other constituent and the absence of topaz.

My composition of matter consists of an anhydrous silicate of alumina which contains topaz or an anhydrous silicate of alumina to which topaz is added in varying amount, and which upon calcination forms mullite either alone or together with a hydrous silicate of alumina such as clay, either plastic or non-plastic, and a temporary binder preferably of organic origin; the whole comprising a suitable material for a super-refractory body.

My product, in whatever form it may be given, comprises mullite formed by calcination of an anhydrous silicate of alumina containing topaz, or to which topaz is added in varying amount, and which upon calcination forms mullite, and shows only the presence of a slight amount of siliceous glass with no excess of either alumina or silica. This shows the chemical formula: $3Al_2O_3.2SiO_2$. The conversion of a mineral to mullite is thus complete.

My process consists in treating an anhydrous silicate of alumina containing topaz or an anhydrous silicate of alumina to which topaz is added in varying amount, and which upon calcination forms mullite, either alone or together with any hydrous silicate of alumina, such as clays, pyrophyllite and the like, in such manner as to produce the so-called super-refractory; and in carrying out my process I first crush the mineral containing topaz to a suitable size for firing; then preferably calcine the crushed material at a sufficiently high temperature to cause complete conversion of the mineral to mullite, which is the only silicate of alumina stable under pyrogenetic conditions. (In this connection it is to be noted that whereas prior to calcination the natural mineral— that is to say, the silicate of alumina containing topaz, or the silicate of alumina to which topaz has been added—was subject to a volume change when fired, the product resulting from the complete conversion of the mineral is absolutely free from any further volume change.)

The mullite so formed is then further crushed, ground and screened into grain sizes suitable for manufacture of any desired refractory body. Such body is then formed by using any temporary binder, usually of organic origin and then firing the body at a temperature sufficient to fuse the various particles into a dense mass.

The body thus formed has withstood all of the severe tests typical of the ideal refractory; for instance, a test of fifty pounds to the square inch load at a temperature of 1500° centrigrade maintained for one and one-half hours. The body without load showed no signs of softening at about 1750° C. The bodies showed as a result of a spalling test, the ability to withstand seventy-three hourly dips from 850° C., to running cold water without the development of a crack or part spalling off from the body.

An erosion test consisting of subjecting the body to the combined action of molten slag, flue gases and high temperatures, in which test a temperature of 1450° C. was maintained, the slag being injected on the crest of the forced draft flame impinging on the body under test, resulted in no evidence of corrosion after four hours using a low fusing coal agent slag, and only a slight amount of corrosion or erosion with slags made decidedly active.

Although I prefer to form the mullite from the anhydrous silicate of alumina containing topaz by its calcination prior to the manufacture of the refractory body itself, I do not limit myself to the use of the mullite formed by the calcination of an anhydrous silicate of alumina containing topaz, but may use mullite obtained by calcining pure topaz alone, or obtained by calcining an anhydrous silicate of alumina to which topaz has been added.

Moreover, I have found that the raw mineral containing topaz or substantially pure topaz itself alone without any clay, and using a temporary binder (preferably one of organic origin) will produce excellent bodies; I therefore do not limit myself to the combination of the raw material with any other material such as a hydrous silicate of alumina.

I claim:

1. The process of forming a refractory body which consists in calcining a composition containing an anhydrous silicate of alumina and topaz to cause conversion to mullite; second, the formation of the body from said mullite by using any temporary binder; and third, firing at a temperature sufficient to convert the various particles into a homogeneous mass.

2. The process of forming a refractory body which consists in calcining a composition containing topaz to cause conversion to mullite; second, the formation of the body from said mullite by using any temporary binder; and third, firing at a temperature sufficient to convert the various particles into a homogeneous mass.

3. The process of forming a refractory body which consists in calcining a composition containing an anhydrous silicate of alumina and topaz to cause conversion to mullite; and third, forming the body and firing at a temperature sufficient to convert the various particles into a homogeneous mass.

4. The process of forming a refractory body which consists in calcining a composition containing topaz to cause conversion to mullite; second, the formation of the body from said mullite by adding clay and a temporary binder; and third, firing at a temperature sufficient to convert the various particles into a homogeneous mass.

5. The process of forming a refractory body which consists in calcining a composition containing an anhydrous silicate of alumina and topaz to cause conversion to mullite; the formation of the body from said mullite by adding clay and a temporary binder; and third, firing at a temperature sufficient to convert the various particles into a homogeneous mass.

6. The process of forming a refractory body which consists in forming the body of a composition containing an anhydrous silicate of alumina and topaz with clay and a temporary binder, and firing at a temperature sufficient to convert the various particles into a homogeneous mass.

7. The process of forming a refractory body which consists in forming the body of a composition containing an anhydrous silicate of alumina and topaz with a temporary binder, and firing at a temperature sufficient to convert the various particles into a homogeneous mass.

8. The process of forming a refractory body which consists in forming the body of a composition containing topaz, with a temporary binder, and firing at a temperature sufficient to convert the various particles into a homogeneous mass.

9. The process of forming a refractory body which consists in forming the body of a composition containing topaz capable of converting to mullite, with a temporary binder, and firing at a temperature sufficient to convert the various particles into a homogeneous mass.

10. The process of forming a refractory body which consists in forming the body of a composition capable of conversion to mullite with topaz, and a temporary binder, and firing at a temperature sufficient to convert the various particles into a homogeneous mass.

11. The process of forming a refractory body which consists in forming the body of a composition containing calcined anhydrous silicate of alumina and topaz with clay and a temporary binder, and firing the same at a temperature sufficient to convert the particles into a homogeneous mass.

12. The process of forming a refractory body which consists in forming the body of a composition capable of conversion to mullite with topaz, clay and a temporary binder, and firing the same at a temperature sufficient to convert the particles into a homogeneous mass.

13. The process of forming a refractory body which consists in forming the body of a calcined composition containing topaz, with a temporary binder, and firing the same at a temperature sufficient to convert the particles into a homogeneous mass.

14. As a new article of manufacture, a refractory body comprising anhydrous silicate of alumina and calcined topaz, the whole converted into a homogeneous mass.

15. As a new article of manufacture, a refractory body comprising calcined topaz, the whole converted into a homogeneous mass.

16. As a new article of manufacture, a refractory body comprising calcined anhydrous silicate of alumina and topaz, converted into a homogeneous mass.

17. As a new article of manufacture, a refractory body comprising calcined anhydrous silicate of alumina and topaz, with clay, the whole converted into a homogeneous mass.

18. As a new article of manufacture, a refractory body comprising mullite, topaz, and clay, the whole converted into a homogeneous mass.

19. As a new article of manufacture, a refractory body comprising an anhydrous silicate of alumina and topaz, the whole converted into a homogeneous mass.

20. As a new article of manufacture, a refractory body comprising a composition containing topaz, the whole converted into a homogeneous mass.

21. A composition of matter comprising mullite formed by calcining an anhydrous silicate of alumina and topaz with a temporary binder.

22. A composition of matter comprising mullite formed by calcining a mineral containing topaz, together with a temporary binder.

23. A composition of matter comprising mullite formed by calcining a mineral containing silicate of alumina and topaz, with clay and a temporary binder.

24. A composition of matter comprising mullite formed by calcining a mineral containing topaz, with clay.

25. A composition of matter comprising an anhydrous silicate of alumina and topaz, with clay.

26. A composition of matter comprising a mineral containing topaz, with clay.

27. A composition of matter comprising an anhydrous silicate of alumina and topaz, and a temporary binder.

28. A composition of matter comprising a mineral containing topaz and a temporary binder.

MEYER L. FREED.